(12) United States Patent
Schulenburg et al.

(10) Patent No.: US 8,304,730 B2
(45) Date of Patent: Nov. 6, 2012

(54) NADIR EMISSIVE HYPERSPECTRAL MEASUREMENT OPERATION (NEHMO)

(75) Inventors: Nielson Wade Schulenburg, Herndon, VA (US); David Wheeler Warren, Los Angeles, CA (US); Donald J. Rudy, San Pedro, CA (US); Michael G. Martino, Inwood, WV (US); Mark Alan Chatelain, Amissville, VA (US); Michael Arthur Rocha, Centreville, VA (US)

(73) Assignee: The Aerospace Corporation, El Segundo, CA (US)

( * ) Notice: Subject to any disclaimer, the term of this patent is extended or adjusted under 35 U.S.C. 154(b) by 325 days.

(21) Appl. No.: 12/791,604

(22) Filed: Jun. 1, 2010

(65) Prior Publication Data

US 2011/0292374 A1 Dec. 1, 2011

(51) Int. Cl.
*G01J 5/00* (2006.01)
(52) U.S. Cl. .................................................. 250/338.1
(58) Field of Classification Search ............... 250/338.1
See application file for complete search history.

(56) References Cited

U.S. PATENT DOCUMENTS

| | | | |
|---|---|---|---|
| 5,440,127 A * | 8/1995 | Squyres | 250/341.8 |
| 5,519,529 A | 5/1996 | Ahearn et al. | |
| 5,760,899 A | 6/1998 | Eismann | |
| 6,379,038 B1 | 4/2002 | Felice | |
| 6,422,508 B1 | 7/2002 | Barnes | |
| 6,580,509 B1 | 6/2003 | Hutchin | |
| 6,675,106 B1 * | 1/2004 | Keenan et al. | 702/28 |
| 6,765,663 B2 | 7/2004 | Byren | |
| 6,819,798 B2 | 11/2004 | Gorin | |
| 6,822,742 B1 | 11/2004 | Kalayeh et al. | |
| 6,995,846 B2 | 2/2006 | Kalayeh et al. | |
| 7,968,848 B2 * | 6/2011 | Johnson et al. | 250/338.1 |
| 2002/0015151 A1 | 2/2002 | Gorin | |
| 2002/0035454 A1 | 3/2002 | Ingram, Jr. et al. | |
| 2003/0123056 A1 | 7/2003 | Barnes et al. | |
| 2003/0174315 A1 | 9/2003 | Byren | |
| 2004/0119020 A1 | 6/2004 | Bodkin | |
| 2005/0134859 A1 | 6/2005 | Kalayeh et al. | |
| 2006/0023948 A1 | 2/2006 | Palmadesso et al. | |

OTHER PUBLICATIONS

Hackwell, J. A., et al., "LWIR/MWIR Imaging Hyperspectral Sensor for Airborne and Ground-based Remote Sensing," *Proc. SPIE Conf. Imaging Spectrometry III*, vol. 2819, Nov. 1996, pp. 102-107.

(Continued)

*Primary Examiner* — David Porta
*Assistant Examiner* — Hugh H Maupin
(74) *Attorney, Agent, or Firm* — Henricks, Slavin & Holmes LLP

(57) ABSTRACT

A method for measuring spectral characteristics includes capturing spectral-spatial data that includes radiance measurements over spectrally flat, highly emissive surface portions of a sample material and heater at least two different heater temperatures for transmissive and/or emissive configurations. Temperatures of the sample material and heater are determined at the different heater temperatures for each configuration using, in each instance, radiance measurements taken after the temperatures of the heater and sample material have both stabilized. The transmissivity of the sample material is determined using the temperatures determined in the transmissive configuration and spectral-spatial data collected at selected points of interest over the sample material. The emissivity of the sample material is determined using the temperatures determined in the emissive configuration, the spectral-spatial data collected at selected points of interest over the sample material, and the transmissivity. The reflectivity of the sample material is determined using the emissivity and transmissivity.

58 Claims, 4 Drawing Sheets

OTHER PUBLICATIONS

Collins, B. H., "Thermal Imagery Spectral Analysis," Master's thesis, Naval Postgraduate School, Monterey, California, 1996.

Collins, B. H., et al., "Thermal Imagery Spectral Analysis," *Proceedings of the SPIE*, vol. 3118, 1997, pp. 94-105.

Salisbury, J. W., "Spectral Measurements Field Guide," Earth Satellite Corporation, Published by the Defense Technology Information Center as Report No. ADA362372, Apr. 23, 1998.

Mielenz, K. D., et al., "Spectroradiometric Determination of the Freezing Temperature of Gold," *Journal of Research of the National Institute of Standards and Technology*, vol. 95, No. 1, Jan.-Feb. 1990, pp. 49-67.

Barnes, R. A., et al., "An Overview of the Visible and Infrared Scanner Radiometric Calibration Algorithm," *Journal of Atmospheric and Oceanic Technology*, Apr. 2000, pp. 395-405.

Salvaggio, C., et al., "Methodologies and protocols for the collection of midwave and longwave infrared emissivity spectra using a portable field spectrometer," *Proceedings of SPIE*, vol. 4381, Apr. 2001, pp. 539-548.

Richter, R., et al., "Bandpass-resampling Effects for the Retrieval of Surface Emissivity," *Applied Optics*, vol. 41, No. 18, Jun. 20, 2002, pp. 3523-3529.

Kirkland, L. E., et al., "First Airborne Thermal Infrared Hyperspectral Imaging of a Dry Lake: Realworld Data and TES/THEMIS Mars Interpretations," Lunar and Planetary Science Conference XXXIV, *abstract 1887*, 2003.

Jarnot, R. F., et al., "EOS MLS Level 1 Data Processing Algorithm Theoretical Basis," Jet Propulsion Laboratory, JPL D-15210, DRL 601 (part 2), Version 2.0, Jun. 22, 2004.

Kerekes, J. P., "Full-Spectrum Spectral Imaging System Analytical Model," *IEEE Transactions on Geoscience and Remote Sensing*, vol. 43, No. 3, Mar. 2005, pp. 571-580.

Jarnot, R. F., et al., "Radiometric and Spectral Performance and Calibration of the GHz Bands of EOS MLS," *MLS GHz Performance/Calibration Paper for IEEE Transactions on Geoscience and Remote Sensing*, Mar. 2005, pp. 1-20.

Mendenhall, J. A., et al., "Spectral and Radiometric Calibration of the Advanced Land Imager," *Lincoln Laboratory Journal*, vol. 15, No. 2, 2005, pp. 207-224.

The Aerospace Corporation, "Remote Infrared Hyperspectral Imaging: For Government and Commercial Applications," © 2007, [previously retrieved on Mar. 31, 2010]. Retrieved from the internet: <URL: http://www.spectir.com/assets/Text%20Files/Brochure-Remote_IR_HSI.pdf>.

The Aerospace Corporation, "Remote Infrared Hyperspectral Imaging," © 2009, [previously retrieved on Mar. 31, 2010]. Retrieved from the internet: <URL: http://www.aero.org/capabilities/documents/AER027_SEBASS_Final.pdf>.

Achal, S., et al., "Flight and Ground Results from Long-Wave and Mid-Wave Airborne Hyperspectral Spectrographic Imagers," RTO-MP-SET-151, Research and Technology Organisation, Canada, Oct. 2009, pp. 11-1-11-10.

The Aerospace Corporation, "Hyperspectral Imager Detects Mineral Deposits," *Crosslink*, vol. 10, No. 1 (Summer 2009), p. 2 [created and last modified Oct. 26, 2009, previously retrieved on Mar. 31, 2010]. Retrieved from the internet: <URL: http://www.aero.org/publications/crosslink/pdfs/V10N1.pdf>.

Harris, P., et al., "Longwave Infrared Imaging of Drillcore," Presentation Outline, Anglo American South Africa, 20th Annual Meeting of the Geological Remote Sensing Group (GRSG), The Geological Society of London, Dec. 15-17, 2009.

GRSG Newsletter, Issue 54, Geological Remote Sensing Group, United Kingdom, Mar. 2010.

The Aerospace Corporation, "Remote Infrared Hyperspectral Imaging: for Government and Commercial Applications," © 2007, [previously retrieved on Mar. 31, 2010]. Retrieved from the internet: <URL: http://www.spectir.com/assets/Text%20Files/Brochure-Remote_IR_HSI.pdf>.

The Aerospace Corporation, "Remote Infrared Hyperspectral Imaging," © 2009, [previously retrieved on Mar. 31, 2010]. Retrieved from the internet: <URL:http://www.aero.org/capabilities/documents/AER027_SEBASS_Final.pdf>.

\* cited by examiner

NADIR EMISSIVE HYPERSPECTRAL MEASUREMENT OPERATION (NEHMO)

TECHNICAL FIELD

The invention relates generally to methods of measuring spectral characteristics of materials and, in particular, to methods and systems for measuring spectral characteristics of materials under controlled conditions of sample and environment.

BACKGROUND ART

Traditionally, the emissivity spectrum of a material has been measured in the laboratory using a single pixel spectral measurement device, such as a Fourier Transform Infrared Radiometer (FTIR). This measurement technique is limited to a single spatial location on a target material at a time. The exact location of the measurement on the target material is difficult to control due to the nature of the single pixel measurement. Further, due to the measurement setup, target materials often have to be modified from their original form in order to conduct the single pixel measurements. For a complex target material consisting of multiple components, separate measurements are necessary to characterize the spectral variations of the target material across its spatial extent. For single pixel spectral measurement devices, spectral characterization of the target material as a function of spatial location on the target material is limited to the number of separate measurements that the operator has the time and patience to measure. Even if an operator has the time to make multiple single-pixel measurements that cover the entire surface of the target material, because of the difficulty of controlling the location of the pixel on the sample, the true spectral-spatial characterization of the target material is not possible.

In remote sensing applications, it is known to deploy multispectral or hyperspectral sensors. For example, the Spatially Enhanced Broadband Array Spectrograph System (SEBASS) created by The Aerospace Corporation of El Segundo, Calif. has a sensor which provides spectral capability in both the mid-wave infrared and long-wave infrared bands. See, e.g., Hackwell, J., Warren, D. W., Bongiovi, R. P., Hansel, S. J., Hayhurst, T. L., Mabry, D. J., Sivjee, M. G., Skinner, J. W., "LWIR/MWIR Imaging Hyperspectral Sensor for Airborne and Ground-based Remote Sensing," *Proc. SPIE Conf. Imaging Spectrometry III*, vol. 2819, November 1996, pp. 102-107, which is incorporated by reference herein in its entirety.

It would be useful to be able to provide methods and systems for measuring spectral characteristics of materials more efficiently, e.g., with fewer measurements. It would be useful to be able to provide methods and systems for accurately measuring spectral characteristics in all areas of a sample, or in larger-sized areas of a sample. It would be useful to be able to provide methods and systems that are capable of providing true independent-of-temperature (i.e., independent of the temperature of the environment) measurements of emissivity, transmissivity, and/or reflectivity for a sample. It would be useful to be able to provide methods and systems that are capable of determining spatial variability in the spectral characteristics of a sample.

SUMMARY OF THE INVENTION

Various example embodiments of the present invention are implemented according to a Nadir Emissive Hyperspectral Measurement Operation (NEHMO) described herein. The spatial nature of the NEHMO measurements, the technique by which the measurements are taken, and the particulars of the NEHMO set-up facilitate, in a single measurement, the capture of data pertaining to the temperature of the sample and the temperature of the environment, as well as the spectral characteristics of the sample. Transmissive, semi-transmissive, and opaque (i.e., non-transmissive) samples can be measured. In example embodiments, the NEHMO measurement technique involves making a set of measurements of a sample, under controlled conditions of sample and environmental temperature. Example embodiments of the methods and systems for measuring spectral characteristics of materials described herein enable high spectral and spatial resolution hyperspectral data (e.g., emissive hyperspectral imaging data) to be collected.

In an example embodiment, a method for measuring spectral characteristics of materials includes providing a sample material and a heater that both include a spectrally flat, highly emissive surface portion. In one or both of an emissive configuration (in which the sample material is in thermal contact with the heater) and a transmissive configuration (in which the sample material is separated from the heater), spectral-spatial data that includes radiance measurements over the spectrally flat, highly emissive surface portions is captured, the spectral-spatial data being captured at least two different heater temperatures for each of the configurations. Temperatures of the sample material and heater are determined at the different heater temperatures for each of the configurations using, in each instance, the radiance measurements taken over the sample material and the heater after the temperatures of both the heater and the sample material have stabilized. If the temperatures were determined for the transmissive configuration, the transmissivity of the sample material is determined using the temperatures of the sample material and heater in the transmissive configuration and the spectral-spatial data collected at selected points of interest over the sample material. The emissivity of the sample material is determined using the temperatures of the sample material and heater in the emissive configuration, the spectral-spatial data collected at selected points of interest over the sample material, and the transmissivity of the sample material. In an example embodiment, the method further includes determining the reflectivity of the sample material using the emissivity and the transmissivity.

The spectral-spatial data is captured, for example, in two or more spectral bands such as mid- and/or long-wave infrared bands. In an example embodiment, the spectral-spatial data includes radiance measurements taken over thermal calibration sources (e.g., two calibration sources).

In an example embodiment, the method further includes performing radiometric calibration of the spectral-spatial data using the radiance measurements taken over thermal calibration sources to generate radiometrically calibrated data. For example, the radiometric calibration is performed prior to determining the temperatures of the sample material and heater.

In an example embodiment, the sample material and the heater each include a spectrally flat, highly emissive surface portion over which the radiance measurements are taken over the sample material and the heater, respectively.

In an example embodiment, a method for measuring spectral characteristics of materials includes: providing a thermal imaging device that is configured to capture spectral-spatial data and to be repositionable in relation to a sample holder and first and second thermal calibration sources; setting the first and second thermal calibration sources to first and second calibration temperatures, respectively; providing a sample material and a heater each with a spectrally flat, highly emissive surface portion; placing the sample material in the holder and in thermal contact with the heater, in an emissive configuration, such that the thermal imaging device has an unobstructed view of the spectrally flat, highly emissive surface portions when the thermal imaging device is in at least one imaging position; sequentially setting the heater to a plurality of emissive configuration heater temperatures and, for each of the emissive configuration heater temperatures, after the temperatures of both the heater and the sample material have stabilized repositioning the imaging device in relation to the sample material, the heater, and the first and second thermal calibration sources, and using the thermal imaging device to capture data that includes radiance measurements; performing radiometric calibration of the data using the radiance measurements taken over the first and second thermal calibration sources to generate radiometrically calibrated data; determining emissive configuration temperatures of the sample material and heater, after the temperature of the heater has stabilized at each of the emissive configuration heater temperatures, respectively, using the radiance measurements taken over the sample material and the heater; and determining the emissivity of the sample material using the emissive configuration temperatures of the sample material and heater and the radiometrically calibrated data collected at selected points of interest over the sample material.

The thermal imaging device is, for example, an imaging spectrograph that measures thermal radiance in two or more spectral bands (e.g., including mid- and long-wave infrared bands). The thermal imaging device can include multispectral and/or hyperspectral sensors. In an example embodiment, the thermal imaging device includes an array (or multiple arrays) of sensing devices.

In an example embodiment, determining the emissivity of the sample material includes determining the transmissivity of the sample material. By way of example, the transmissivity of the sample material is determined by: repositioning the heater in relation to the sample material such that the sample material is separated from the heater, in a transmissive configuration, and such that the thermal imaging device has an unobstructed view of the spectrally flat, highly emissive surface portions when the thermal imaging device is in at least one imaging position; sequentially setting the heater to a plurality of transmissive configuration heater temperatures and, for each of the emissive configuration heater temperatures, after the temperatures of both the heater and the sample material have stabilized repositioning the imaging device in relation to the sample material, the heater, and the first and second thermal calibration sources, and using the thermal imaging device to add additional radiance measurements to the data; determining transmissive configuration temperatures of the sample material and heater, after the temperature of the heater has stabilized at each of the transmissive configuration heater temperatures, respectively, using the radiance measurements taken over the sample material and the heater in the transmissive configuration; and determining the transmissivity of the sample material using the transmissive configuration temperatures of the sample material and heater and the radiometrically calibrated data collected at selected points of interest over the sample material. In an example embodiment, the method further includes using the emissivity and the transmissivity to determine the reflectivity of the sample material.

In an example embodiment, a method for measuring spectral characteristics of materials includes: providing a thermal imaging device that is configured to capture spectral-spatial data and to be repositionable in relation to a sample material and first and second thermal calibration sources; setting the first and second thermal calibration sources to first and second calibration temperatures, respectively; providing a sample material and a heater each with a spectrally flat, highly emissive surface portion; placing the sample material in thermal contact with the heater, in an emissive configuration, such that the thermal imaging device has an unobstructed view of the spectrally flat, highly emissive surface portions when the thermal imaging device is in at least one imaging position; sequentially setting the heater to a plurality of emissive configuration heater temperatures and, for each of the emissive configuration heater temperatures, after the temperatures of both the heater and the sample material have stabilized repositioning the imaging device in relation to the sample material, the heater, and the first and second thermal calibration sources, and using the thermal imaging device to capture data that includes radiance measurements; repositioning the heater in relation to the sample material such that the sample material is separated from the heater, in a transmissive configuration, and such that the thermal imaging device has an unobstructed view of the spectrally flat, highly emissive surface portions when the thermal imaging device is in at least one imaging position; sequentially setting the heater to a plurality of transmissive configuration heater temperatures and, for each of the emissive configuration heater temperatures, after the temperatures of both the heater and the sample material have stabilized repositioning the imaging device in relation to the sample material, the heater, and the first and second thermal calibration sources, and using the thermal imaging device to add additional radiance measurements to the data; performing radiometric calibration of the data using the radiance measurements taken over the first and second thermal calibration sources to generate radiometrically calibrated data; determining transmissive configuration temperatures of the sample material and heater, after the temperature of the heater has stabilized at each of the transmissive configuration heater temperatures, respectively, using the radiance measurements taken over the sample material and the heater in the transmissive configuration; determining emissive configuration temperatures of the sample material and heater, after the temperature of the heater has stabilized at each of the emissive configuration heater temperatures, respectively, using the radiance measurements taken over the sample material and the heater in the emissive configuration; determining the transmissivity of the sample material using the transmissive configuration temperatures of the sample material and heater and the radiometrically calibrated data collected at selected points of interest over the sample material; and determining the emissivity of the sample material using the emissive configuration temperatures of the sample material and heater, the radiometrically calibrated data collected at selected points of interest over the sample material, and the transmissivity of the sample material.

In an example embodiment, a system for measuring spectral characteristics of materials includes: a thermal imaging device that is configured to capture spectral-spatial data; a repositioning device configured to reposition the thermal imaging device in relation to a sample holder and first and second thermal calibration sources; a heater mechanically coupled to the sample holder such that the heater can be selectively moved between an emissive configuration, in which the heater is in thermal contact with a sample material attached to the holder, and a transmissive configuration, in which the heater is separated from the sample material; and a controller (or multiple controllers, processors, or the like) configured to generate control signals that are provided to the thermal imaging device, the repositioning device, the first and second thermal calibration sources, and the heater to (a) set the first and second thermal calibration sources to first and second calibration temperatures, respectively, (b) sequentially set the heater to a plurality of emissive configuration heater temperatures, when the heater is in the emissive configuration, (c) sequentially set the heater to a plurality of transmissive configuration heater temperatures, when the heater is in the transmissive configuration, (d) reposition the thermal imaging device in relation to the sample material, the heater, and the first and second thermal calibration sources, (e) use the thermal imaging device to capture data that includes radiance measurements taken over the sample material, the heater, and the first and second thermal calibration sources, (f) perform radiometric calibration of the data using the radiance measurements taken over the first and second thermal calibration sources to generate radiometrically calibrated data, (g) for semi-transparent sample materials, determine transmissive configuration temperatures of the sample material and heater, after the temperature of the heater has stabilized at each of the transmissive configuration heater temperatures, respectively, using the radiance measurements taken over the sample material and the heater in the transmissive configuration, (h) determine emissive configuration temperatures of the sample material and heater, after the temperature of the heater has stabilized at each of the emissive configuration heater temperatures, respectively, using the radiance measurements taken over the sample material and the heater in the emissive configuration, (i) for semi-transparent sample materials, determine the transmissivity of the sample material using the transmissive configuration temperatures of the sample material and heater and the radiometrically calibrated data collected at selected points of interest over the sample material, (j) determine the emissivity of the sample material using the emissive configuration temperatures of the sample material and heater, the radiometrically calibrated data collected at selected points of interest over the sample material, and, for semi-transparent sample materials, the transmissivity of the sample material, and (k) determine the reflectivity of the sample material using the emissivity and, for semi-transparent sample materials, the transmissivity.

DISCLOSURE OF INVENTION

Example methods and systems for measuring spectral characteristics of materials described herein capture, process, and/or utilize spectral-spatial data, which can be, for example, multispectral data or hyperspectral data captured for spatial pixels of a scene.

In example embodiments of the methods and systems for measuring spectral characteristics of materials described herein, various thermal imaging devices can be used to capture spectral-spatial data (e.g., for a sample material in a laboratory setting). By way of example, thermal imaging devices suitable for implementing the methods and systems described herein include multispectral or hyperspectral sensors, as well as imaging systems that include one or more of these sensors.

Figure 1:
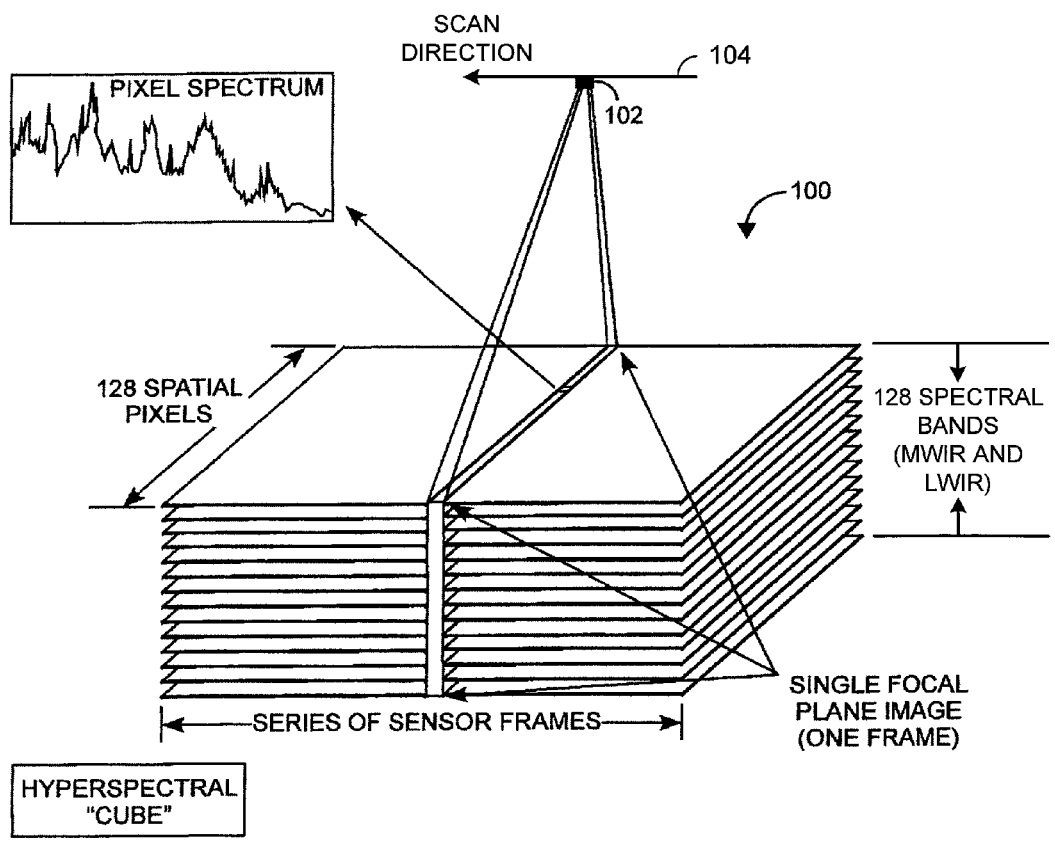
FIG. 1 illustrates an example of hyperspectral sensing.

A hyperspectral image is a three dimensional array of numbers $\{x_i, y_j, \lambda_k\}$, usually called a "cube", consisting of the intensities of light observed at each of a discrete set of wavelengths, and at every spatial pixel in a scene. A cube can be visualized as a stack of single band images of the spatial scene, with each layer representing a different wavelength band. FIG. 1 illustrates an example of a hyperspectral cube 100, which can be collected using a line scanner 102 such as the Spatially Enhanced Broadband Array Spectrograph System (SEBASS) sensor from The Aerospace Corporation of El Segundo, Calif. In this example, movement of the line scanner 102 in relation to the region being scanned effects a scan path along a direction indicated by the arrow 104. By way of example, the line scanner 102 includes an array of sensors that provide 128 spectral bands for both MWIR (e.g., 2.4 to 5.3 µm) and LWIR (e.g., 7.6 to 13.5 µm) perpendicular to 128 spatial pixels, thus providing a series of sensor frames captured along the scan path.

A "data cube" consists of a set or other collection of data for two spatial dimensions and one spectral dimension. For purposes of this description, the term "spatial-spectral data" includes sets or collections of data, such as a "data cube" as well as other sets or collections of data, for at least two spatial dimensions and at least one spectral dimension.

In example embodiments of the methods and systems for measuring spectral characteristics of materials described herein, spectrally and radiometrically calibrated hyperspectral data cubes are generated and/or utilized.

Figure 2:
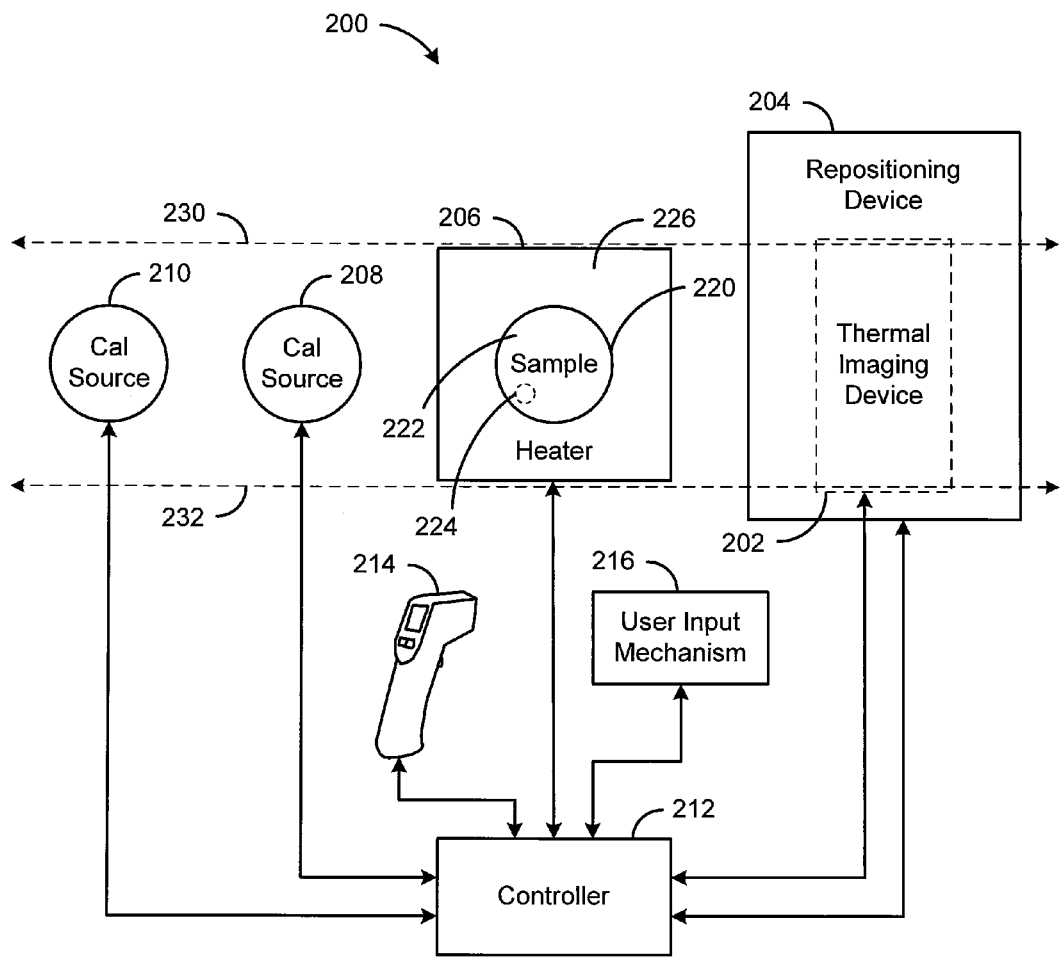
FIG. 2 is a diagram of an example embodiment of a system for measuring spectral characteristics of materials.

Referring to FIG. 2, in an example embodiment, a system 200 for measuring spectral characteristics of materials includes a thermal imaging device 202 (in this figure, shown in dashed lines), a repositioning device 204, a heater 206, first and second thermal calibration sources 208 and 210, a controller 212, a thermometer 214, and a user input mechanism 216, configured as shown. In an example embodiment, the thermal imaging device 202 is an imaging spectrograph (e.g., including a sensor such as the SEBASS sensor) that measures thermal radiance in two or more spectral bands. In an example embodiment, the two or more spectral bands include mid- and/or long-wave infrared bands. In an example embodiment, the thermal imaging device 202 includes multispectral and/or hyperspectral sensors. In an example embodiment, the thermal imaging device 202 includes an array of sensing devices.

The thermal imaging device 202 is configured to capture spectral-spatial data. To this end, in this example embodiment, the repositioning device 204 is configured to reposition the thermal imaging device 202 in relation to a sample holder 220 and the thermal calibration sources 208 and 210 (e.g., NIST thermal calibration sources), which are used for calibrating the thermal imaging device 202. In other embodiments, the sample holder 220 (which holds a sample material 222) is repositioned in relation to the thermal imaging device 202. The sample material 222 can be an opaque material, such as sand, concrete, or a human, or a transmissive material, such as clothing or vegetation.

In an example embodiment, the heater 206 is mechanically coupled to the sample holder 220 such that the heater 206 can be selectively moved between an emissive configuration, in which the heater 206 is in thermal contact with the sample material 222, and a transmissive configuration, in which the heater 206 is separated from the sample material 222. Thus, in an example embodiment, the sample material 222 is either heated or illuminated using one or more controlled thermal sources. In an example embodiment, the heater 206 is thermostatically controlled.

The controller 212 is configured to generate control signals that are provided to the thermal imaging device 202, the repositioning device 204, the heater 206, and the first and second thermal calibration sources 208 and 210. The sample material 222 (e.g., a test article of interest) is placed in the sample holder 220, and the repositioning device 204 translates the thermal imaging device 202 over the sample material 222 along an "imaging path" designated by scan boundary lines 230 and 232 (shown in dashed lines) while the thermal imaging device 202 collects spatial-spectral data (e.g., hyperspectral data).

The user input mechanism 216 (e.g., a graphical user interface, display and keyboard, mouse, etc.), when present, is configured to allow a user of the system 200 to provide an input, such as an indication that the sample material 222 is opaque, or other parameter, setting or the like utilized by processing, control or other operations performed by the controller 212.

Figure 3:
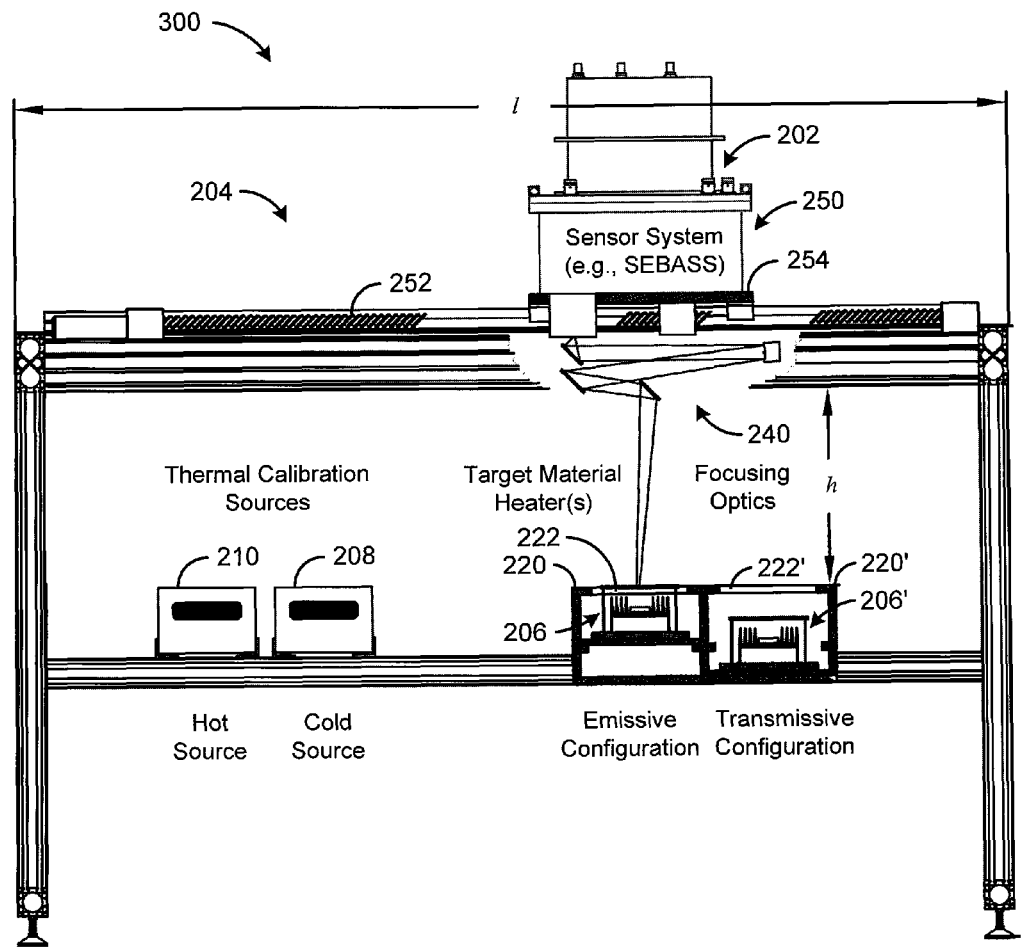
FIG. 3 illustrates an example setup configuration for a system for measuring spectral characteristics of materials.

Referring also to FIG. 3, which shows an example setup configuration for a system for measuring spectral characteristics of materials, the first and second thermal calibration sources 208 and 210 are controlled to function as "cold" and "hot" calibration sources, respectively. In this figure, the emissive and transmissive configurations are shown, side-by-side, to illustrate the different respective positions of the heater 206 in each configuration. In the emissive configuration, the sample material 222 is held by the sample holder 220, and the heater 206 is positioned in direct thermal contact with the sample material 222. In the transmissive configuration, the sample material 222' is held by the sample holder 220', and the heater 206' is separated from the sample material 222'. By way of example, the heater, in the transmissive configuration, is separated from the sample material by a distance of approximately 4 cm.

As shown in FIG. 3, a structural framework 300 (e.g., a rack) can be utilized to provide a space-efficient setup configuration. Moreover, in an example embodiment, external optics are mounted (e.g., to the SEBASS aperture) to change the focus of the thermal imaging device 202 to a distance of 1-m from the sensor. In an example embodiment, the framework 300 is configured length, l, and height, h, (i.e., the distance between an upper rail and the sample material) dimensions, as shown, of approximately 102 inches and 20 inches, respectively.

In this example embodiment, the thermal imaging device 202 is provided with optics (or optical system) 240 for changing the focus of the thermal imaging device 202. In an example embodiment, the spectral-spatial data is captured by a sensor at a distance, which also includes the length of an optical path defined by the optics (if any), of approximately one meter or less from the sample material (e.g., when the thermal imaging device is in at least one imaging position of the thermal imaging device).

In this example embodiment, the repositioning device 204 includes a drive motor 250 and bearings 252 (e.g., linear bearings) for repositioning a platform 254 (to which the thermal imaging device 202 is mounted) horizontally along portions (e.g., top rails) of the framework 300. As shown in this example embodiment, the sample material 222 and the first and second thermal calibration sources 208 and 210 are positioned (e.g., mounted within the framework 300) within the imaging path of the thermal imaging device 202.

The length of the scan determines the number of pixels of spatial information collected in the along-track direction. The spatial resolution is dependant upon the magnification of the optics 240. In an example embodiment, the magnification is set at 1 mm. The scan speed is controlled by a computer, such as the controller 212, to ensure square pixels. In an example embodiment, two spatial dimensions of data are collected by physically translating a wide array detector in a direction perpendicular to the width of the array.

Referring again to FIG. 2, in various example embodiments, the sample material 222 and the heater 206 each include a spectrally flat, highly emissive surface portion over which the radiance measurements are taken over the sample material 222 and the heater 206, respectively. For example, the sample material 222 includes a spectrally flat, highly emissive surface portion 224 (shown with dashed lines). The spectrally flat, highly emissive surface portion 224 can be, for example, a small spot approximately 1.5 cm in diameter. In an example embodiment, the spectrally flat, highly emissive surface portion 224 is a coating applied directly or indirectly to the sample material 222 (e.g., the spectrally flat, highly emissive surface portion 224 is painted onto the sample material 222, or applied to a tape or other material that is adhered to the sample material 222). In an example embodiment, a part of the heater 206 is always exposed, and this part of the heater 206 includes a spectrally flat, highly emissive surface portion 226. In this example, the portion 226 (e.g., a spectrally flat, highly emissive coating) covers the entire exposed portion of the heater 206. In other embodiments, only a portion of the exposed area of the heater 206 is spectrally flat and highly emissive.

The controller 212 can be one or more controllers, processors, or other computing devices. In an example embodiment, the controller 212 is configured to generate control signals to set the first and second thermal calibration sources 208 and 210 to first and second calibration temperatures, respectively, sequentially set the heater 206 to a plurality of emissive configuration heater temperatures (when the heater 206 is in the emissive configuration), sequentially set the heater 206 to a plurality of transmissive configuration heater temperatures (when the heater 206 is in the transmissive configuration), reposition the thermal imaging device 202 in relation to the sample material 222, the heater 206, and the first and second thermal calibration sources 208 and 210, use the thermal imaging device 202 to capture data that includes radiance measurements taken over the sample material 222, the heater 206, and the first and second thermal calibration sources 208 and 210, and perform radiometric calibration of the data using the radiance measurements taken over the first and second thermal calibration sources 208 and 210 to generate radiometrically calibrated data. (The controller 212 can also be configured to process the spectral-spatial data in conjunction with other data, such as data captured by devices that utilize other bands of the electromagnetic spectrum.)

In various example embodiments, radiometric calibration (e.g., to facilitate valid comparisons of spectra from different origins) is performed utilizing the measurements, techniques, and setup configurations described herein. Other reflectance-based radiometric calibration methods can be utilized. In various example embodiments, nonuniformity compensation and bad pixel compensation processes can also be implemented and performed.

In an example embodiment, the controller 212 is configured to determine (for semi-transparent sample materials) transmissive configuration temperatures of the sample material 222 and heater 206, after the temperature of the heater 206 has stabilized at each of the transmissive configuration heater temperatures, respectively, using the radiance measurements taken over the sample material 222 and the heater 206 in the transmissive configuration. The controller 212 is further configured to determine emissive configuration temperatures of the sample material 222 and heater 206, after the temperature of the heater 206 has stabilized at each of the emissive configuration heater temperatures, respectively, using the radiance measurements taken over the sample material 222 and the heater 206 in the emissive configuration. For example, the thermometer 214 (e.g., a non-contact handheld infrared thermometer) is used to determine when the temperature of the sample material 222 has stabilized. In an example embodiment, the temperatures of the sample material 222 and heater 206 are determined from the radiance measurements by utilizing Planck's equation.

In an example embodiment, the controller 212 is further configured to determine (for semi-transparent sample materials) the transmissivity of the sample material 222 using the transmissive configuration temperatures of the sample material 222 and heater 206 and the radiometrically calibrated data collected at selected points of interest over the sample material, determine the emissivity of the sample material 222 using the emissive configuration temperatures of the sample material 222 and heater 206, the radiometrically calibrated data collected at selected points of interest over the sample material 222, and (for semi-transparent sample materials) the transmissivity of the sample material 222, and determine the reflectivity of the sample material 222 using the emissivity and (for semi-transparent sample materials) the transmissivity. In an example embodiment, the points of interest include all or most of the pixels on the target material. In various example embodiments, the points of interest are selected in consideration of the size of the material, the uniformity of appearance across the material, interfaces of non-uniformity regions on the material, and regions of distortions of the material. Examples of uniformity of appearance differences include texture, color, gloss, density, surface particle size, pattern or coatings. Examples of interfaces of non-uniformity regions include seams on transparent materials or mineral boundaries on drill core samples. Examples of regions of distortions involve cracks, visible alterations, dents, spills burns. By measuring the points of interest identified through these means, the spectral-spatial characterization of the entire material is more complete compared to measuring a limited area of the sample. The spectral-spatial variations can be reported in terms of the fractional percentages of the material that have different emissivity or transmissivity profiles. The measured emissivities can be used to identify the material composition by comparing to a library of known material emissivities. The fractional percentage of the material composition can be reported in terms of area, or the material composition can be reported in terms of spatial location within the sample, e.g. along a vertical or horizontal line or distance from an edge or reference point on the sample. By measuring across interfaces or non-uniformities on the sample, spectral-spatial characterization can be used to show how material variations or regions of distortions affect the overall emissivity/transmissivity of the sample. This is especially useful for predicting how the emissivity of a sample would appear to an alternative remote sensing instrument with larger pixel size, coarser spectral resolution, more limited spectral band pass or lower sensitivity.

In an example embodiment, in the case of non-transparent materials, two measurements are made at two different temperatures. In an example embodiment, in the case of semi-transparent materials, four measurements are made at two different temperatures. At each temperature, one measurement is made with the heater in contact with the sample and one measurement is made with the heater separated from the sample material (e.g., sufficiently separated such that the sample remains at room temperature). In the transmissive configuration, with the sample at room temperature, the total radiance measured by the thermal imaging device under these conditions can be described as follows:

$$L_T(T_1) = \epsilon \times P(T_{1S}) + \rho \times P(T_{env}) + \tau \times P(T_{1H}) \quad (1)$$

$$L_T(T_2) = \epsilon \times P(T_{2S}) + \rho \times P(T_{env}) + \tau \times P(T_{2H}) \quad (2)$$

Equations (1) and (2) are solved for transmissivity, in terms of emissivity, yielding:

$$\tau = \frac{L_T(T_2) - L_T(T_1)}{\Delta P_{TH}} - \frac{\epsilon \times \Delta P_{TS}}{\Delta P_{TH}} \quad (3)$$

Similarly, the total radiance measured in the emissive configuration, with the sample heated above ambient temperature, can be described as follows:

$$L_E(T_1) = \epsilon \times P(T_{1S}) + \rho \times P(T_{env}) + \tau \times P(T_{1H}) \quad (4)$$

$$L_E(T_2) = \epsilon \times P(T_{2S}) + \rho \times P(T_{env}) + \tau \times P(T_{2H}) \quad (5)$$

Solving (4) and (5) for emissivity, and substituting the expression for transmissivity from (3) yields the following equation for emissivity:

$$\epsilon = \frac{(\Delta L_E)/\Delta P_{ES} - (\Delta L_T \times \Delta P_{EH})/\Delta P_{TH} \times \Delta P_{ES}}{1 - \Delta P_{TS} \times \Delta P_{EH}/\Delta P_{TH} \times \Delta P_{ES}} \quad (6)$$

Transmissivity is then computed using (3), and reflectivity is computed from the following equation:

$$\tau + \rho + \epsilon = 1 \quad (7)$$

The technique described above is dependant upon knowing the temperature of the heater and the temperature of the sample. In an example embodiment, the radiance measurements from the highly emissive portions of the sample material and the heater are used to compute temperature, according to Planck's equation pertaining to blackbody radiation as set forth below:

$$B_\lambda(T) = \frac{C_1 \lambda^{-5}}{e^{\frac{C_2}{\lambda T}} - 1} \quad [\mu W/cm^2 \mu m\, sr]$$

$$C_1 = 1.19104 \times 10^{10} \quad [\mu W/cm^2 \mu m\, sr]$$

$$C_2 = 1.438769 \times 10^4 \quad [\mu m\, K]$$

$$\lambda = \text{wavelength} \quad [\mu m]$$

$$T = \text{temperature} \quad [K]$$

The emission characteristics of sample materials can be determined by comparing the thermal emission of the real object to a blackbody radiating at the same temperature. The ratio of these quantities is the spectral emissivity of an object as set forth below:

$$\epsilon_\lambda = \frac{L_{emitted}}{B_\lambda(T)}$$

$$L_{emitted} = \text{emitted radiance}$$

The NEHMO operating and measurement procedure facilitates determination of the spectral emissivity (and transmissivity for semi-transparent materials) for every pixel collected in the two dimensional spatial image. Example embodiments of the measurement procedures described herein provide spatial coverage of the sample material (i.e., target material) that is both complete and precisely known, without having to modify the target material during the measurement procedure.

Figure 4:
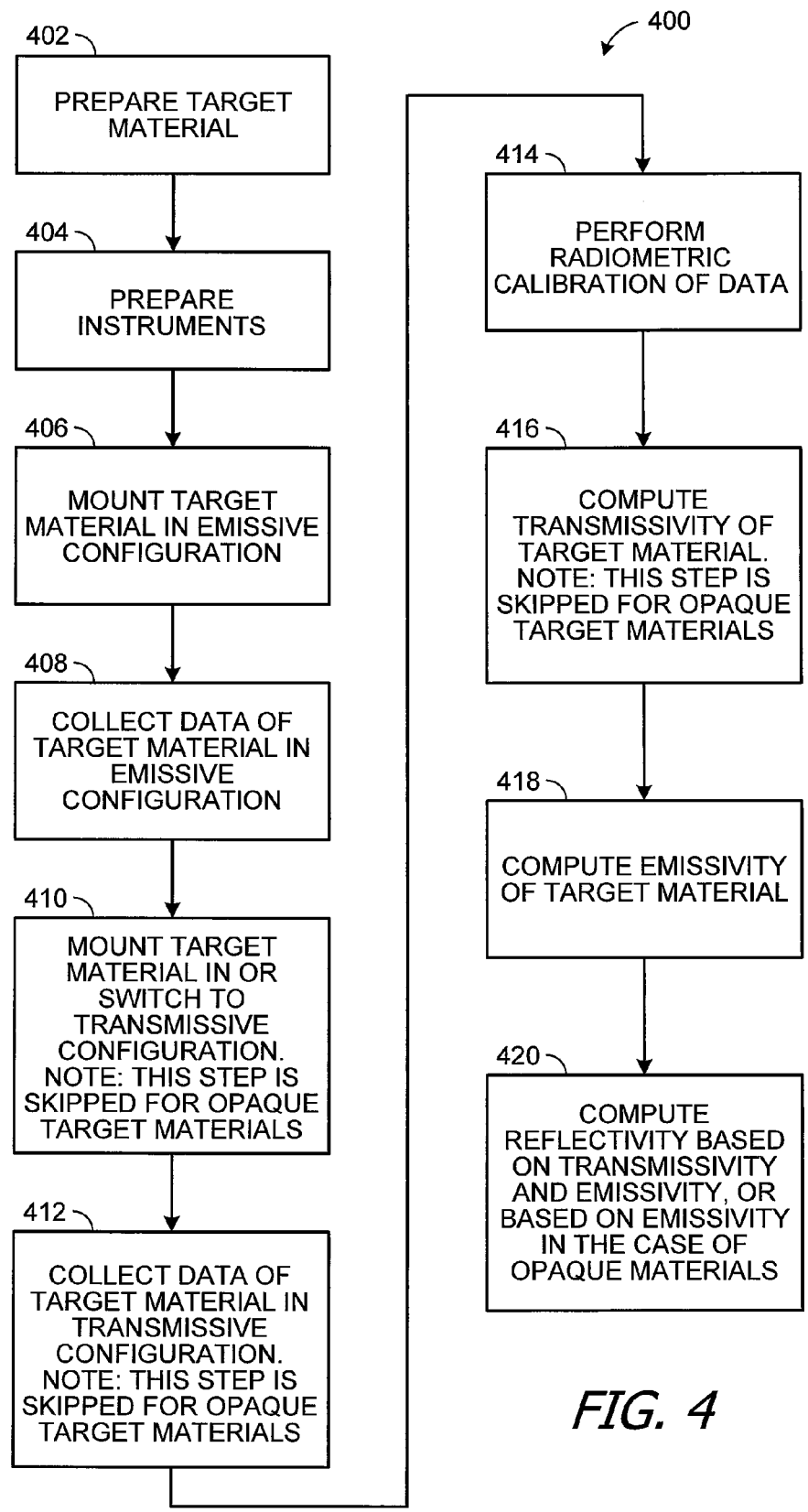
FIG. 4 is a flow diagram of an example method for measuring spectral characteristics of materials.

FIG. 4 is a flow diagram of an example method 400 for measuring spectral characteristics of materials, which is described with reference to the SEBASS sensor and its associated technologies. It should be understood that the principles described herein are applicable to, and can be implemented with, other thermal imaging devices.

At 402, the sample material (or target material) is prepared. In an example embodiment, the process of preparing the target material includes: applying a small spot, e.g., approximately 1.5 cm diameter, of spectrally flat, highly emissive coating directly to the target material, or applying a spectrally flat, highly emissive coating to a piece of aluminum tape, and adhering the coated tape to the target material.

At 404, the instruments are prepared. In an example embodiment, the process of preparing instruments includes: installing SEBASS external optics and ensuring alignment; installing radiometric shielding over the optics to minimize environmental effects and eliminate reflection component; turning the SEBASS data acquisition computer on, launching the data acquisition program, and running the program for 30 minutes, thus allowing the SEBASS instrument and its associated hardware to stabilize prior to acquiring data; turning the scanner control computer on and launching the scanner control program; turning the radiometric calibration sources and controller on, setting the cold radiometric calibration source to 30° C., and setting the hot radiometric calibration source to 50° C.; turning the target material heater control computer on, launching the heater control program, and setting the heater temperature to its first (lowest) set point, which is approximately 5° C. above ambient temperature; and ensuring the proper height of the sensor above the measurement so the data will be in focus. In an example embodiment, the first and second calibration temperatures are both above ambient temperature. In an example embodiment, the first and second calibration temperatures are approximately 30° C. and approximately 50° C., respectively. In an example embodiment, the emissive configuration heater temperatures include a lowest set point which is approximately 5° C. above ambient temperature.

At 406, the target material is mounted in the emissive configuration. In an example embodiment, the process of mounting the target material in emissive configuration includes: clamping the target material to the top of the target holder, ensuring that it is stretched tight; placing the target material heater in the upper rack of the target holder, ensuring that the target material heater is in mechanical contact with the target material, and ensuring that part of the target material heater is unobscured by the target; and ensuring that the spot of spectrally flat, highly emissive coating, the unobscured part of the target material heater, and the target material itself are all within the field of view of the SEBASS sensor.

At 408, data of the target material is collected in the emissive configuration. In an example embodiment, the process of collecting data of target material in the emissive configuration includes: (a) setting the target material heater to its first (lowest) measurement temperature; (b) allowing the target material heater to stabilize at its set temperature, and using a handheld infrared thermometer to verify that the temperature of the target material has also stabilized; (c) traversing the SEBASS sensor to the cold radiometric calibration source, and collecting three cubes of data from the cold radiometric calibration source; (d) traversing the SEBASS sensor to the hot radiometric calibration source, and collecting three cubes of data from the hot radiometric calibration source; (e) traversing the SEBASS sensor across the target material holder and collecting a data cube including the exposed part of the target material heater, the spot of spectrally flat, highly emissive coating, and the target material; (f) traversing the SEBASS sensor to the cold radiometric calibration source, and collecting three cubes of data from the cold radiometric calibration source; (g) traversing the SEBASS sensor to the hot radiometric calibration source, and collecting three cubes of data from the hot radiometric calibration source; (h) setting the target material heater to its second (higher) measurement temperature, and repeating steps (b) through (g); and (i) setting the target material heater to its third (highest) measurement temperature and repeating steps (b) through (g).

At 410, the target material is mounted in (or switched to) transmissive configuration. Note: This step is skipped for opaque target materials. In an example embodiment, the process of mounting target material in (or switching the target material to) transmissive configuration includes: leaving the target material clamped to the top of the target holder, ensuring that it is stretched tight and is in the same location as during the emissive measurements; placing the target material heater in the lower rack of the target holder, ensuring that the target material heater is 4 cm below the target material, and ensuring that part of the target material heater is unobscured by the target; and ensuring that the spot of spectrally flat, highly emissive coating, the unobscured part of the target material heater, and the target material itself are all within the field of view of the SEBASS sensor At 412, data of the target material is collected in the transmissive configuration. Note: This step is skipped for opaque target materials. In an example embodiment, the process of collecting data of target material in the transmissive configuration includes: (a) setting the target material heater to its first (lowest) measurement temperature; (b) allowing the target material heater to stabilize at its set temperature, and using a handheld infrared thermometer to verify that the temperature of the target material has also stabilized; (c) traversing the SEBASS sensor to the cold radiometric calibration source, and collecting three cubes of data from the cold radiometric calibration source; (d) traversing the SEBASS sensor to the hot radiometric calibration source, and collecting three cubes of data from the hot radiometric calibration source; (e) traversing the SEBASS sensor across the target material holder and collecting a data cube including the exposed part of the target material heater, the spot of spectrally flat, highly emissive coating, and the target material; (f) traversing the SEBASS sensor to the cold radiometric calibration source, and collecting three cubes of data from the cold radiometric calibration source; (g) traversing the SEBASS sensor to the hot radiometric calibration source, and collecting three cubes of data from the hot radiometric calibration source; (h) setting the target material heater to its second (higher) measurement temperature, and repeating steps (b) through (g); and (i) setting the target material heater to its third (highest) measurement temperature and repeating steps (b) through (g). In an example embodiment, the emissive configuration heater temperatures (of step 408) and the transmissive configuration heater temperatures (of step 412) are the same sequence of temperatures.

At 414, radiometric calibration of the data is performed. In an example embodiment, the process of performing radiometric calibration of the data is performed prior to determining the temperatures of the sample material and heater (as described below in step 416).

At 416, the transmissivity of the target material is computed. Note: This step is skipped for opaque target materials. In an example embodiment, the process of computing the transmissivity of the target material includes: (a) computing the temperature of the target material heater in the transmissive configuration at the first (lowest) set point, using radiometrically calibrated SEBASS data collected from the target material heater while traversing the SEBASS sensor over the target material holder; (b) computing the temperature of the target material heater in the transmissive configuration at the second (higher) set point, using radiometrically calibrated SEBASS data collected from the target material heater while traversing the SEBASS sensor over the target material holder; (c) computing the temperature of the target material in the transmissive configuration at the first (lowest) set point, using radiometrically calibrated SEBASS data collected from the spot of spectrally flat, highly emissive coating while traversing the SEBASS sensor over the target material holder; (d) computing the temperature of the target material in the transmissive configuration at the second (higher) set point, using radiometrically calibrated SEBASS data collected from the spot of spectrally flat, highly emissive coating while traversing the SEBASS sensor over the target material holder; (e) selecting points of interest on the target material; and (f) computing transmissivity of the target material using radiometrically calibrated SEBASS data collected from the points of interest while traversing the SEBASS sensor over the target material, along with the temperatures computed in steps (a) through (d).

At 418, the emissivity of the target material is computed. In an example embodiment, the process of computing the emissivity of the target material includes: (a) computing the temperature of the target material heater in the emissive configuration at the first (lowest) set point, using radiometrically calibrated SEBASS data collected from the target material heater while traversing the SEBASS sensor over the target material holder; (b) computing the temperature of the target material heater in the emissive configuration at the second (higher) set point, using radiometrically calibrated SEBASS data collected from the target material heater while traversing the SEBASS sensor over the target material holder; (c) computing the temperature of the target material in the emissive configuration at the first (lowest) set point, using radiometrically calibrated SEBASS data collected from the spot of spectrally flat, highly emissive coating while traversing the SEBASS sensor over the target material holder; (d) computing the temperature of the target material in the emissive configuration at the second (higher) set point, using radiometrically calibrated SEBASS data collected from the spot of spectrally flat, highly emissive coating while traversing the SEBASS sensor over the target material holder; (e) computing emissivity of the target material using radiometrically calibrated SEBASS data collected from the selected points of interest on the target material (computed at 416, step (e)) while traversing the SEBASS sensor over the target material, along with the temperatures computed in steps (a) through (d) and the transmissivity (computed at 416, step (f)) for semi-transparent materials.

At 420, the reflectivity of the target material is computed. In an example embodiment, the process of computing the reflectivity of the target material includes: computing reflectivity based on the transmissivity and emissivity (computed at 416 and 418, respectively) or based on the emissivity (computed at 418 only) in the case of opaque materials.

The NEHMO measurements can be utilized in a variety of applications. By way of example, the emissivity, transmissivity and reflectivity spectra can be used in conjunction with field measurements to assist in material identification. The controlled nature of the measurements allows the spectral characteristics for various materials and configurations to be explored, for example, the spectral characteristics of contamination on various materials, and the spectral characteristics of semi-transparent materials placed over nontransparent materials.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A method for measuring spectral characteristics of materials comprising:
providing a sample material and a heater that both include a spectrally flat, highly emissive surface portion;
in one or both of an emissive configuration, in which the sample material is in thermal contact with the heater, and a transmissive configuration, in which the sample material is separated from the heater, capturing spectral-spatial data that includes radiance measurements over the spectrally flat, highly emissive surface portions, the spectral-spatial data being captured at least two different heater temperatures for each of the configurations;
determining temperatures of the sample material and heater at the different heater temperatures for each of the configurations using, in each instance, the radiance measurements taken over the sample material and the heater after the temperatures of both the heater and the sample material have stabilized;
if the temperatures were determined for the transmissive configuration, determining the transmissivity of the sample material using the temperatures of the sample material and heater in the transmissive configuration and the spectral-spatial data collected at selected points of interest over the sample material; and
determining the emissivity of the sample material using the temperatures of the sample material and heater in the emissive configuration, the spectral-spatial data collected at selected points of interest over the sample material, and the transmissivity of the sample material.

2. The method for measuring spectral characteristics of materials of claim 1, wherein the spectral-spatial data is captured in two or more spectral bands that include mid- or long-wave infrared bands.

3. The method for measuring spectral characteristics of materials of claim 1, wherein the spectral-spatial data is captured by a sensor at a distance of approximately one meter or less from the sample material.

4. The method for measuring spectral characteristics of materials of claim 1, further comprising:
determining the reflectivity of the sample material using the emissivity and the transmissivity.

5. The method for measuring spectral characteristics of materials of claim 1, wherein the spectral-spatial data includes radiance measurements taken over thermal calibration sources.

6. The method for measuring spectral characteristics of materials of claim 5, further comprising:
  performing radiometric calibration of the spectral-spatial data using the radiance measurements taken over thermal calibration sources to generate radiometrically calibrated data.

7. The method for measuring spectral characteristics of materials of claim 6, wherein the radiometric calibration is performed prior to determining the temperatures of the sample material and heater.

8. The method for measuring spectral characteristics of materials of claim 1, wherein the sample material and the heater each include a spectrally flat, highly emissive surface portion over which the radiance measurements are taken over the sample material and the heater, respectively.

9. The method for measuring spectral characteristics of materials of claim 1, further comprising:
  using a non-contact thermometer to determine when the temperature of the sample material has stabilized.

10. The method for measuring spectral characteristics of materials of claim 1, wherein the temperatures of the sample material and heater are determined from the radiance measurements by utilizing Planck's equation.

11. A method for measuring spectral characteristics of materials comprising:
  providing a thermal imaging device that is configured to capture spectral-spatial data and to be repositionable in relation to a sample holder and first and second thermal calibration sources;
  setting the first and second thermal calibration sources to first and second calibration temperatures, respectively;
  providing a sample material and a heater each with a spectrally flat, highly emissive surface portion;
  placing the sample material in the holder and in thermal contact with the heater, in an emissive configuration, such that the thermal imaging device has an unobstructed view of the spectrally flat, highly emissive surface portions when the thermal imaging device is in at least one imaging position;
  sequentially setting the heater to a plurality of emissive configuration heater temperatures and, for each of the emissive configuration heater temperatures, after the temperatures of both the heater and the sample material have stabilized
    repositioning the imaging device in relation to the sample material, the heater, and the first and second thermal calibration sources, and
    using the thermal imaging device to capture data that includes radiance measurements;
  performing radiometric calibration of the data using the radiance measurements taken over the first and second thermal calibration sources to generate radiometrically calibrated data;
  determining emissive configuration temperatures of the sample material and heater, after the temperature of the heater has stabilized at each of the emissive configuration heater temperatures, respectively, using the radiance measurements taken over the sample material and the heater; and
  determining the emissivity of the sample material using the emissive configuration temperatures of the sample material and heater and the radiometrically calibrated data collected at selected points of interest over the sample material.

12. The method for measuring spectral characteristics of materials of claim 11, wherein the thermal imaging device is an imaging spectrograph that measures thermal radiance in two or more spectral bands.

13. The method for measuring spectral characteristics of materials of claim 12, wherein the two or more spectral bands include mid- or long-wave infrared bands.

14. The method for measuring spectral characteristics of materials of claim 11, wherein the thermal imaging device includes multispectral or hyperspectral sensors.

15. The method for measuring spectral characteristics of materials of claim 11, wherein the thermal imaging device includes an array of sensing devices.

16. The method for measuring spectral characteristics of materials of claim 11, wherein the thermal imaging device includes a sensor that is approximately one meter or less in distance from the sample material when the thermal imaging device is in the at least one imaging position.

17. The method for measuring spectral characteristics of materials of claim 11, wherein the thermal imaging device is provided with optics for changing the focus of the thermal imaging device.

18. The method for measuring spectral characteristics of materials of claim 11, wherein the first and second calibration temperatures are both above ambient temperature.

19. The method for measuring spectral characteristics of materials of claim 11, wherein the first and second calibration temperatures are approximately 30° C. and approximately 50° C., respectively.

20. The method for measuring spectral characteristics of materials of claim 11, wherein the spectrally flat, highly emissive surface portion of the sample material is approximately 1.5 cm in diameter.

21. The method for measuring spectral characteristics of materials of claim 11, wherein the spectrally flat, highly emissive surface portion of the sample material is a coating applied directly or indirectly to the sample material.

22. The method for measuring spectral characteristics of materials of claim 11, wherein the emissive configuration heater temperatures include a lowest set point which is approximately 5° C. above ambient temperature.

23. The method for measuring spectral characteristics of materials of claim 11, further comprising:
  using a non-contact thermometer to determine when the temperature of the sample material has stabilized.

24. The method for measuring spectral characteristics of materials of claim 11, wherein the temperatures of the sample material and heater are determined from the radiance measurements by utilizing Planck's equation.

25. The method for measuring spectral characteristics of materials of claim 11, wherein determining the emissivity of the sample material includes determining the transmissivity of the sample material.

26. The method for measuring spectral characteristics of materials of claim 25, wherein determining the transmissivity of the sample material includes:
  repositioning the heater in relation to the sample material such that the sample material is separated from the heater, in a transmissive configuration, and such that the thermal imaging device has an unobstructed view of the spectrally flat, highly emissive surface portions when the thermal imaging device is in at least one imaging position;
  sequentially setting the heater to a plurality of transmissive configuration heater temperatures and, for each of the emissive configuration heater temperatures, after the temperatures of both the heater and the sample material have stabilized repositioning the imaging device in relation to the sample material, the heater, and the first and second thermal calibration sources, and using the thermal imaging device to add additional radiance measurements to the data;

determining transmissive configuration temperatures of the sample material and heater, after the temperature of the heater has stabilized at each of the transmissive configuration heater temperatures, respectively, using the radiance measurements taken over the sample material and the heater in the transmissive configuration; and determining the transmissivity of the sample material using the transmissive configuration temperatures of the sample material and heater and the radiometrically calibrated data collected at selected points of interest over the sample material.

27. The method for measuring spectral characteristics of materials of claim 25, further comprising:
using the emissivity and the transmissivity to determine the reflectivity of the sample material.

28. A method for measuring spectral characteristics of materials comprising:

providing a thermal imaging device that is configured to capture spectral-spatial data and to be repositionable in relation to a sample material and first and second thermal calibration sources;

setting the first and second thermal calibration sources to first and second calibration temperatures, respectively;

providing a sample material and a heater each with a spectrally flat, highly emissive surface portion;

placing the sample material in thermal contact with the heater, in an emissive configuration, such that the thermal imaging device has an unobstructed view of the spectrally flat, highly emissive surface portions when the thermal imaging device is in at least one imaging position;

sequentially setting the heater to a plurality of emissive configuration heater temperatures and, for each of the emissive configuration heater temperatures, after the temperatures of both the heater and the sample material have stabilized repositioning the imaging device in relation to the sample material, the heater, and the first and second thermal calibration sources, and using the thermal imaging device to capture data that includes radiance measurements;

repositioning the heater in relation to the sample material such that the sample material is separated from the heater, in a transmissive configuration, and such that the thermal imaging device has an unobstructed view of the spectrally flat, highly emissive surface portions when the thermal imaging device is in at least one imaging position;

sequentially setting the heater to a plurality of transmissive configuration heater temperatures and, for each of the emissive configuration heater temperatures, after the temperatures of both the heater and the sample material have stabilized repositioning the imaging device in relation to the sample material, the heater, and the first and second thermal calibration sources, and using the thermal imaging device to add additional radiance measurements to the data;

performing radiometric calibration of the data using the radiance measurements taken over the first and second thermal calibration sources to generate radiometrically calibrated data;

determining transmissive configuration temperatures of the sample material and heater, after the temperature of the heater has stabilized at each of the transmissive configuration heater temperatures, respectively, using the radiance measurements taken over the sample material and the heater in the transmissive configuration;

determining emissive configuration temperatures of the sample material and heater, after the temperature of the heater has stabilized at each of the emissive configuration heater temperatures, respectively, using the radiance measurements taken over the sample material and the heater in the emissive configuration;

determining the transmissivity of the sample material using the transmissive configuration temperatures of the sample material and heater and the radiometrically calibrated data collected at selected points of interest over the sample material; and determining the emissivity of the sample material using the emissive configuration temperatures of the sample material and heater, the radiometrically calibrated data collected at selected points of interest over the sample material, and the transmissivity of the sample material.

29. The method for measuring spectral characteristics of materials of claim 28, wherein the thermal imaging device is an imaging spectrograph that measures thermal radiance in two or more spectral bands.

30. The method for measuring spectral characteristics of materials of claim 29, wherein the two or more spectral bands include mid- or long-wave infrared bands.

31. The method for measuring spectral characteristics of materials of claim 28, wherein the thermal imaging device includes multispectral or hyperspectral sensors.

32. The method for measuring spectral characteristics of materials of claim 28, wherein the thermal imaging device includes an array of sensing devices.

33. The method for measuring spectral characteristics of materials of claim 28, wherein the thermal imaging device includes a sensor that is approximately one meter or less in distance from the sample material when the thermal imaging device is in the at least one imaging position.

34. The method for measuring spectral characteristics of materials of claim 28, wherein the thermal imaging device is provided with optics for changing the focus of the thermal imaging device.

35. The method for measuring spectral characteristics of materials of claim 28, wherein the first and second calibration temperatures are both above ambient temperature.

36. The method for measuring spectral characteristics of materials of claim 28, wherein the first and second calibration temperatures are approximately 30° C. and approximately 50° C., respectively.

37. The method for measuring spectral characteristics of materials of claim 28, wherein the spectrally flat, highly emissive surface portion of the sample material is approximately 1.5 cm in diameter.

38. The method for measuring spectral characteristics of materials of claim 28, wherein the spectrally flat, highly emissive surface portion of the sample material is a coating applied directly or indirectly to the sample material.

39. The method for measuring spectral characteristics of materials of claim 28, wherein the heater temperatures include a lowest set point which is approximately 5° C. above ambient temperature.

40. The method for measuring spectral characteristics of materials of claim 28, wherein the emissive configuration heater temperatures and the transmissive configuration heater temperatures are the same sequence of temperatures.

41. The method for measuring spectral characteristics of materials of claim 28, wherein the heater, in the transmissive configuration, is separated from the sample material by a distance of approximately 4 cm.

42. The method for measuring spectral characteristics of materials of claim 28, further comprising:
using a non-contact thermometer to determine when the temperature of the sample material has stabilized.

43. The method for measuring spectral characteristics of materials of claim 28, the temperatures of the sample material and heater are determined from the radiance measurements by utilizing Planck's equation.

44. The method for measuring spectral characteristics of materials of claim 28, further comprising:
using the emissivity and the transmissivity to determine the reflectivity of the sample material.

45. A system for measuring spectral characteristics of materials comprising:
a thermal imaging device that is configured to capture spectral-spatial data;
a repositioning device configured to reposition the thermal imaging device in relation to a sample holder and first and second thermal calibration sources;
a heater mechanically coupled to the sample holder such that the heater can be selectively moved between an emissive configuration, in which the heater is in thermal contact with a sample material attached to the holder, and a transmissive configuration, in which the heater is separated from the sample material; and
a controller configured to generate control signals that are provided to the thermal imaging device, the repositioning device, the first and second thermal calibration sources, and the heater to
set the first and second thermal calibration sources to first and second calibration temperatures, respectively,
sequentially set the heater to a plurality of emissive configuration heater temperatures, when the heater is in the emissive configuration,
sequentially set the heater to a plurality of transmissive configuration heater temperatures, when the heater is in the transmissive configuration,
reposition the thermal imaging device in relation to the sample material, the heater, and the first and second thermal calibration sources,
use the thermal imaging device to capture data that includes radiance measurements taken over the sample material, the heater, and the first and second thermal calibration sources,
perform radiometric calibration of the data using the radiance measurements taken over the first and second thermal calibration sources to generate radiometrically calibrated data,
for semi-transparent sample materials, determine transmissive configuration temperatures of the sample material and heater, after the temperature of the heater has stabilized at each of the transmissive configuration heater temperatures, respectively, using the radiance measurements taken over the sample material and the heater in the transmissive configuration,
determine emissive configuration temperatures of the sample material and heater, after the temperature of the heater has stabilized at each of the emissive configuration heater temperatures, respectively, using the radiance measurements taken over the sample material and the heater in the emissive configuration,
for semi-transparent sample materials, determine the transmissivity of the sample material using the transmissive configuration temperatures of the sample material and heater and the radiometrically calibrated data collected at selected points of interest over the sample material,
determine the emissivity of the sample material using the emissive configuration temperatures of the sample material and heater, the radiometrically calibrated data collected at selected points of interest over the sample material, and, for semi-transparent sample materials, the transmissivity of the sample material, and
determine the reflectivity of the sample material using the emissivity and, for semi-transparent sample materials, the transmissivity.

46. The system for measuring spectral characteristics of materials of claim 45, wherein the thermal imaging device is an imaging spectrograph that measures thermal radiance in two or more spectral bands.

47. The system for measuring spectral characteristics of materials of claim 46, wherein the two or more spectral bands include mid- or long-wave infrared bands.

48. The system for measuring spectral characteristics of materials of claim 45, wherein the thermal imaging device includes multispectral or hyperspectral sensors.

49. The system for measuring spectral characteristics of materials of claim 45, wherein the thermal imaging device includes an array of sensing devices.

50. The system for measuring spectral characteristics of materials of claim 45, wherein the thermal imaging device includes a sensor that is approximately one meter or less in distance from the sample material when the thermal imaging device is in at least one imaging position of the thermal imaging device.

51. The system for measuring spectral characteristics of materials of claim 45, wherein the thermal imaging device is provided with optics for changing the focus of the thermal imaging device.

52. The system for measuring spectral characteristics of materials of claim 45, wherein the first and second calibration temperatures are both above ambient temperature.

53. The system for measuring spectral characteristics of materials of claim 45, wherein the first and second calibration temperatures are approximately 30° C. and approximately 50° C., respectively.

54. The system for measuring spectral characteristics of materials of claim 45, wherein the sample material and the heater each include a spectrally flat, highly emissive surface portion over which the radiance measurements are taken over the sample material and the heater, respectively.

55. The system for measuring spectral characteristics of materials of claim 45, wherein the heater temperatures include a lowest set point which is approximately 5° C. above ambient temperature.

56. The system for measuring spectral characteristics of materials of claim 45, wherein the emissive configuration heater temperatures and the transmissive configuration heater temperatures are the same sequence of temperatures.

57. The system for measuring spectral characteristics of materials of claim 45, wherein the heater, in the transmissive configuration, is separated from the sample material by a distance of approximately 4 cm.

58. The system for measuring spectral characteristics of materials of claim 45, wherein the temperatures of the sample material and heater are determined from the radiance measurements by utilizing Planck's equation.

* * * * *